US011100677B2

(12) United States Patent
Shibata

(10) Patent No.: US 11,100,677 B2
(45) Date of Patent: Aug. 24, 2021

(54) INFORMATION PROCESSING DEVICE, INFORMATION PROCESSING METHOD AND RECORDING MEDIUM

(71) Applicant: NEC CORPORATION, Tokyo (JP)

(72) Inventor: Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/647,696

(22) PCT Filed: Sep. 14, 2018

(86) PCT No.: PCT/JP2018/034155
§ 371 (c)(1),
(2) Date: Mar. 16, 2020

(87) PCT Pub. No.: WO2019/059120
PCT Pub. Date: Mar. 28, 2019

(65) Prior Publication Data
US 2020/0279400 A1 Sep. 3, 2020

(30) Foreign Application Priority Data
Sep. 22, 2017 (JP) .............................. JP2017-182578

(51) Int. Cl.
*G06T 7/00* (2017.01)
*G06T 7/55* (2017.01)
*G06T 5/00* (2006.01)

(52) U.S. Cl.
CPC ................ *G06T 7/97* (2017.01); *G06T 5/002* (2013.01); *G06T 7/55* (2017.01)

(58) Field of Classification Search
None
See application file for complete search history.

(56) References Cited

U.S. PATENT DOCUMENTS 8,319,797 B2* 11/2012 Swanson .............. H04N 5/2256
345/634
8,934,670 B2* 1/2015 Feris .................. G06K 9/00718
382/103

(Continued)

FOREIGN PATENT DOCUMENTS

JP 06-258048 A 9/1994
JP 11-149576 A 6/1999

(Continued)

OTHER PUBLICATIONS

Zhang et al, Underexposed Video Enhancement via Perception-Driven Progressive Fusion, IEEE Transactions on Visualization and Computer Graphics, vol. 22, No. 6, Jun. 2016 (Year: 2016).*

(Continued)

*Primary Examiner* — Andrae S Allison
(74) *Attorney, Agent, or Firm* — Sughrue Mion, PLLC

(57) ABSTRACT

The disclosure is an information processing device including: a memory; and at least one processor coupled to the memory and performing operations. The operations includes: generating, based on a target image including a target and a standard image not including the target, a target structure image indicating a shape feature of an object included in the target image and a standard structure image indicating a shape feature of an object included in the standard image, in each of a plurality of imaging conditions; calculating an individual difference being a difference between the target structure image and the standard structure image, and a composite difference based on the individual differences; calculating an individual smoothness being a smoothness of the target structure image, and a composite smoothness based on the individual smoothness; and generating a silhouette image of the target, based on the composite difference and the composite smoothness.

8 Claims, 6 Drawing Sheets

(56) References Cited

U.S. PATENT DOCUMENTS

| | | | | |
|---|---|---|---|---|
| 10,880,498 | B2* | 12/2020 | Tokizaki | H04N 5/2258 |
| 2008/0050021 | A1* | 2/2008 | Plant | H04N 5/262 |
| | | | | 382/209 |
| 2010/0104256 | A1* | 4/2010 | Tsurumi | G06K 9/00308 |
| | | | | 386/241 |
| 2010/0194932 | A1* | 8/2010 | Mitsuya | H04N 5/3572 |
| | | | | 348/241 |
| 2010/0201828 | A1* | 8/2010 | Mitsuya | H04N 5/217 |
| | | | | 348/208.6 |
| 2011/0148875 | A1* | 6/2011 | Kim | G06T 13/40 |
| | | | | 345/420 |
| 2014/0334692 | A1* | 11/2014 | Uhrmann | G06T 7/11 |
| | | | | 382/110 |
| 2020/0265567 | A1* | 8/2020 | Hu | G06N 3/08 |
| 2020/0357102 | A1* | 11/2020 | Pekkucuksen | H04N 5/23277 |

FOREIGN PATENT DOCUMENTS

| | | | |
|---|---|---|---|
| JP | 2009-164949 | * | 7/2009 |
| JP | 2012-208759 A | | 10/2012 |

OTHER PUBLICATIONS

Davis et al, Background-Subtraction in Thermal Imagery Using Contour Saliency, International Journal of Computer Vision 71(2), 161-181, 2007 (Year: 2007).*

Veeraraghavan A, A. K. Roy-Chowdhury and R. Chellappa, "Matching shape sequences in video with applications in human movement analysis," in IEEE Transactions on Pattern Analysis and Machine Intelligence, vol. 27, No. 12, pp. 1896-1909, Dec. 2005, doi: 10.1109/TPAMI.2005.246. (Year: 2005).*

Kim, Jihwan, Hyunho Choi, and Jechang Jeong. "Multi-exposure image fusion based on patch using global and local characteristics." 2018 41st International Conference on Telecommunications and Signal Processing (TSP). IEEE, 2018. (Year: 2018).*

Ying et al, A Bio-Inspired Multi-Exposure Fusion Framework for Low-light Image Enhancement, Journal of Latex Class Files, vol. 14, No. 8, Aug. 2015 (Year: 2015).*

Zhang et al, Underexposed Video Enhancement via Perception-Driven Progressive Fusion, IEEE Transactions on Visualization and Computer Graphics, vol. 22, No. 6, Jun. 2016 1773 (Year: 2016).*

Samuel, Geoffrey, and Honghai Liu. "Comparison of complex-background subtraction algorithms using a fixed camera." Intelligent System and Robotics University of Portsmouth (2010): 1-4. (Year: 2010).*

Ahn, Jung-Ho, and Hyeran Byun. "Human silhouette extraction method using region based background subtraction." International Conference on Computer Vision/Computer Graphics Collaboration Techniques and Applications. Springer, Berlin, Heidelberg, 2007. (Year: 2007).*

Aldo Laurentini, "The Visual Hull Concept for Silhouette-Based Image Understanding", IEEE Transactions on pattern analysis and machine intelligence, Feb. 1994, pp. 150-162, vol. 16, Issue: 2.

Kalin Kolev, et al., "Fast Joint Estimation of Silhouettes and Dense 3D Geometry from Multiple Images", IEEE Transactions on Pattern Analysis and Machine Intelligence (TPAMI),(Mar. 2012), pp. 493-505, vol. 34, Issue: 3.

John Bastian, et al., "Interactive Modelling for AR Applications", Mixed and Augmented Reality (ISMAR), 2010 9th IEEE International Symposium on Mixed and Augmented Reality, Oct. 2010, pp. 199-206.

Kaiming HE, et al., "Guided Image Filtering", IEEE Transactions on Pattern Analysis and Machine Intelligence, Jun. 2013, pp. 1397-1409, vol. 35, Issue: 6.

George Petschnigg, et al., "Digital photography with flash and no-flash image pairs", ACM Transactions on Graphics (TOG), ACM SIGGRAPH 2004, Aug. 2004, pp. 664-672, vol. 23, Issue 3.

Xiaoyong Shen, et al., "Mutual-Structure for Joint Filtering", The IEEE International Conference on Computer Vision (ICCV), 2015, pp. 3406-3414.

Yuri Boykov, et al., "Fast approximate energy minimization via graph cuts", IEEE Transactions on Pattern Analysis and Machine Intelligence, Nov. 2001, pp. 1222-1239, vol. 23, Issue: 11.

Tomohiko Yano, et al., "Estimation of 3D Shape and Transmittance Distribution of Translucent Underwater Object by Multi-Viewpoint Image", IPSJ SIG Technical Report, Computer Vision and IMage Media (CVIM), 2015-CVIM-196, Mar. 6, 2015, pp. 1-8.

International Search Report for PCT/JP2018/034155 dated Oct. 23, 2018 [PCT/ISA/210].

Written Opinion for PCT/JP2018/034155 dated Oct. 23, 2018 [PCT/ISA/237].

* cited by examiner

INFORMATION PROCESSING DEVICE, INFORMATION PROCESSING METHOD AND RECORDING MEDIUM

CROSS REFERENCE TO RELATED APPLICATIONS

This application is a National Stage of International Application No. PCT/JP2018/034155 filed Sep. 14, 2018, claiming priority based on Japanese Patent Application No. 2017-182578 filed Sep. 22, 2017.

TECHNICAL FIELD

The present invention relates to processing of an image, and in particular to an information processing device and the like that process a shape of an object image.

BACKGROUND ART

An imaging device operates in various settings (e.g., setting of an exposure or exposure time). Alternatively, among imaging devices, there is an imaging device that has different sensitivity characteristics for various wavelength bands and captures an image according to each sensitivity characteristic.

Further, even in the same setting, the imaging device can capture a substantially different image, based on a lighting fixture and/or how to use a flash (whether or not to use a flash).

Practical application and price reduction of the imaging device that accommodates the various imaging conditions (setting, lighting, and the like) as described above have been promoted. For example, a plurality of imaging devices having different characteristics are available. Alternatively, there is a widespread use of an imaging device by switching, for each imaging purpose, the imaging device suitable for the purpose.

With regard to monitoring a person or the like in a predetermined place, for example, monitoring by using a plurality of cameras is possible as follows. A surveillance camera with a visible light sensor is used for monitoring in the daytime and in a time zone when lighting is on. On the other hand, with regard to monitoring in a time zone when lighting is off in the nighttime, a surveillance camera with an invisible light sensor such as a near-infrared sensor and/or a far-infrared sensor is used.

Electromagnetic waves to be used for monitoring are not limited to the above and include ultraviolet rays, a terahertz wave, a radio wave, and the like.

As described above, it is easy to capture a plurality of images with different imaging conditions for the same target.

In addition, a method for restoring a shape of a target included in a visible-light image by using a plurality of visible-light images is proposed.

One of the methods for restoring a shape of a target included in a plurality of visible-light images is a silhouette method (also referred to as a "volume intersection") (see Non-Patent Literature (NPL) 1). The silhouette method is a method that uses a plurality of silhouette images and calculates a shape in which the plurality of silhouette images are the most satisfied. The silhouette image is an image in which an inner part of an outline of an object is filled with a single color, or a monochromatic image that reflects a shape of the object.

Various methods are proposed as a method for generating the silhouette image. For example, methods for generating the silhouette image includes a background subtraction method, a method using an edge, a method using a color, a method using an outline, and the like.

Note that NPLs 2 to 7 represented below are related techniques to be used for the later description.

CITATION LIST

Non Patent Literature

[NPL 1] Aldo Laurentini, "The Visual Hull Concept for Silhouette-Based Image Understanding", IEEE Transactions on pattern analysis and machine intelligence, Volume: 16, Issue: 2, (Feb. 1994), pp. 150-162

[NPL2] Kalin Kolev, Thomas Brox, and Daniel Cremers, "Fast Joint Estimation of Silhouettes and Dense 3D Geometry from Multiple Images", IEEE Transactions on Pattern Analysis and Machine Intelligence (TPAMI), Volume: 34, Issue: 3, (Mar. 2012), pp. 493-505

[NPL3] John Bastian, Ben Ward, Rhys Hill, Anton van den Hengel, Anthony Dick, "Interactive Modelling for AR Applications", Mixed and Augmented Reality (ISMAR), 2010 9th IEEE International Symposium on Mixed and Augmented Reality, (Oct. 2010), pp. 199-206

[NPL4] Kaiming He, Jian Sun, and Xiaoou Tang, "Guided Image Filtering", IEEE Transactions on Pattern Analysis and Machine Intelligence, Volume: 35, Issue: 6 (Jun. 2013), pp. 1397-1409

[NPL5] George Petschnigg, Richard Szeliski, Maneesh Agrawala, Michael Cohen, Huques Hoppe, and Kentaro Toyama, "Digital photography with flash and no-flash image pairs", ACM Transactions on Graphics (TOG), (ACM SIGGRAPH 2004), Volume 23, Issue 3, Aug. 2004, pp. 664-672

[NPL6] Xiaoyong Shen, Chao Zhou, Li Xu, and Jiaya Jia, "Mutual-Structure for Joint Filtering", The IEEE International Conference on Computer Vision (ICCV), 2015, pp. 3406-3414

[NPL7] Yuri Boykov, Olga Veksler, and Ramin Zabih, "Fast approximate energy minimization via graph cuts", IEEE Transactions on Pattern Analysis and Machine Intelligence, Volume: 23, Issue: 11, (Nov. 2001), pp. 1222-1239

SUMMARY OF INVENTION

Technical Problem

In order to apply the silhouette method, a silhouette image of a target is required.

However, a general method for generating a silhouette image, such as the background subtraction method, generates, when the image of the target has a shadow, blown out highlights, and/or a blocked up shadow, an incorrect silhouette image.

Alternatively, when the target is a transparent object such as glass or acrylic, the target transmits visible light. Thus, an object being a background of the target is included in an image in a range of the target. In such a case, it is difficult to distinguish a foreground being the target from the background object by a general method for generating the silhouette image, such as the background subtraction method. For this reason, when a transparent object is used as the target in visible light, there is an issue that the general method for generating the silhouette image, such as the background subtraction method, cannot generate an accurate silhouette image.

Specifically, when a shadow, blown out highlights, and/or a blocked up shadow exist in the image of the target, and when the target is a transparent object such as glass or acrylic, there is an issue that the general method for generating the silhouette image, such as the background subtraction method, cannot generate the accurate silhouette image.

Therefore, when the target has a shadow, blown out highlights, and/or a blocked up shadow, the technique described in NPL 1 cannot restore a highly precise shape.

Then, a method for generating a silhouette image with high precision for a shadow, blown out highlights, and/or a blocked up shadow in a target is proposed (e.g., see NPLs 2 and 3).

However, when the silhouette image is generated, the techniques described in NPLs 2 and 3 generate the silhouette image by acquiring information of a guide for the silhouette image from a user. For this reason, the techniques described in NPLs 2 and 3 have an issue that it is necessary for a user to input information being a guide manually.

An object of the present invention is to solve the above-described issue and to provide an information processing device and the like that generate an appropriate silhouette image without requiring information being a guide.

Solution to Problem

An information processing device according to one aspect of the present invention includes:

a memory; and at least one processor coupled to the memory, the processor performing operations. The operations includes:

generating, based on a target image that includes a target and a standard image that does not include the target, a target structure image being an image of an element indicating a shape feature of an object included in the target image, in each of a plurality of imaging conditions;

generating, based on the target image and the standard image, a standard structure image being an image of an element indicating a shape feature of an object included in the standard image, in each of a plurality of the imaging conditions;

calculating an individual difference being a difference between the target structure image and the standard structure image in each of the imaging conditions, and calculating, based on the individual differences, a composite difference;

calculating an individual smoothness being a smoothness of the target structure image in each of the imaging conditions, and calculating, based on the individual smoothness, a composite smoothness; and generating a silhouette image of the target, based on the composite difference and the composite smoothness.

An information processing system according one aspect of the present invention includes:

the above-mentioned information processing device;

an image capturing device that transmits the target image and the standard image to the information processing device; and an image processing device that receives the silhouette image from the information processing device, calculates a shape of the target, based on the silhouette image, and outputs an object indicating the calculated shape.

An information processing method according to one aspect of the present invention includes:

generating, based on a target image that includes a target and a standard image that does not include the target, a target structure image being an image of an element indicating a shape feature of an object included in the target image, in each of a plurality of imaging conditions;

generating, based on the target image and the standard image, a standard structure image being an image of an element indicating a shape feature of an object included in the standard image, in each of a plurality of the imaging conditions;

calculating an individual difference being a difference between the target structure image and the standard structure image in each of the imaging conditions, and calculating, based on the individual differences, a composite difference;

calculating an individual smoothness being a smoothness of the target structure image in each of the imaging conditions, and calculating, based on the individual smoothness, a composite smoothness; and generating a silhouette image of the target, based on the composite difference and the composite smoothness.

A non-transitory computer-readable recording medium according one aspect of the present invention computer-readably embodies a program. The program causes a computer to perform a method. The method includes:

generating, based on a target image that includes a target and a standard image that does not include the target, a target structure image being an image of an element indicating a shape feature of an object included in the target image, in each of a plurality of imaging conditions;

generating, based on the target image and the standard image, a standard structure image being an image of an element indicating a shape feature of an object included in the standard image, in each of a plurality of the imaging conditions;

calculating an individual difference being a difference between the target structure image and the standard structure image in each of the imaging conditions, and calculating, based on the individual differences, a composite difference;

calculating an individual smoothness being a smoothness of the target structure image in each of the imaging conditions, and calculating, based on the individual smoothness, a composite smoothness; and generating a silhouette image of the target, based on the composite difference and the composite smoothness.

Advantageous Effects of Invention

The present invention is able to produce an advantageous effect of generating an appropriate silhouette image without requiring information being a guide.

EXAMPLE EMBODIMENT

Figure 1:
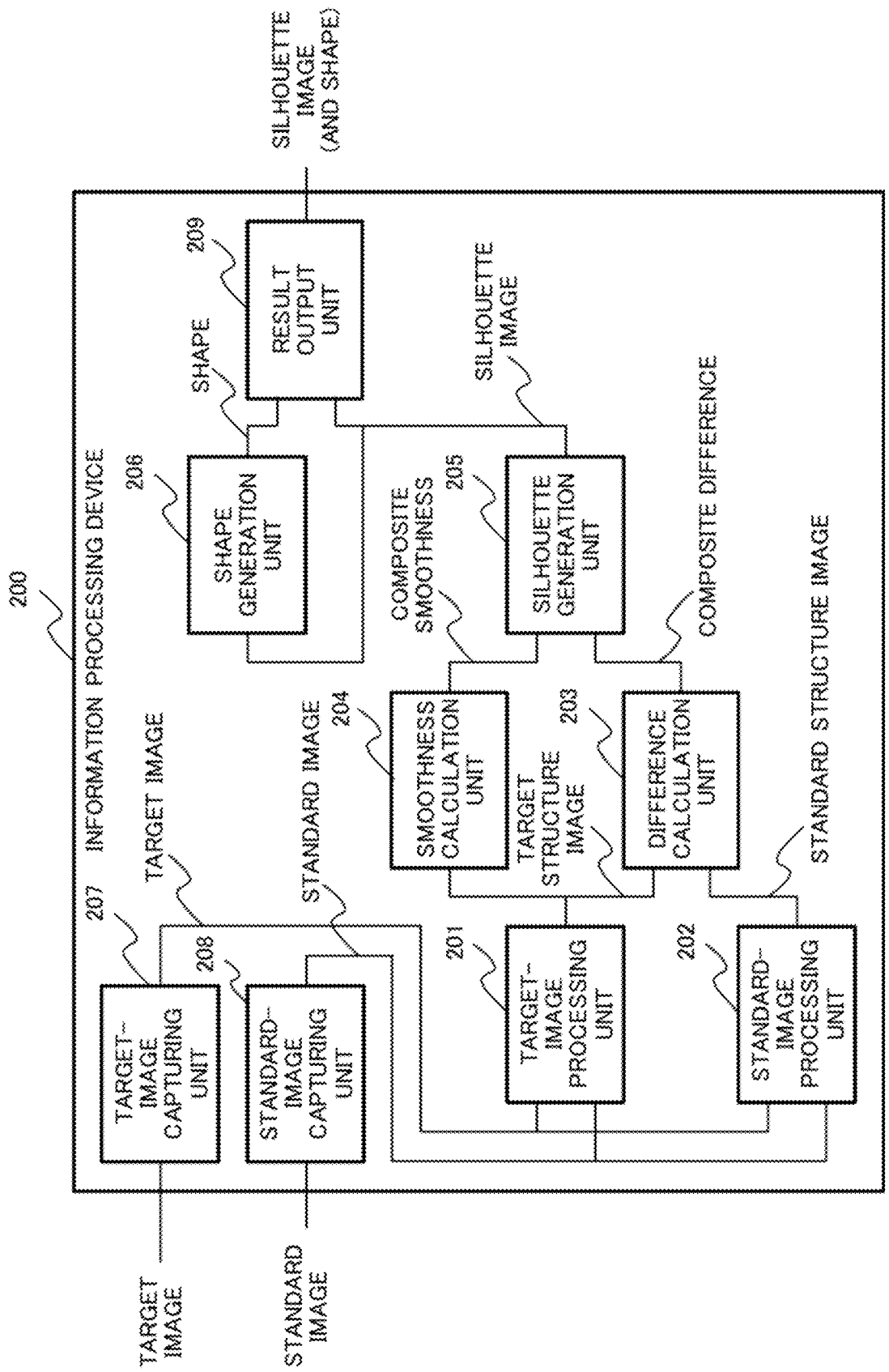
FIG. 1 is a block diagram illustrating one example of a configuration of an information processing device according to a first example embodiment of the present invention.

Hereinafter, with reference to the drawings, an example embodiment of the invention is described.

Note that each drawing is for describing the example embodiment of the present invention. However, the present invention is not limited to the description of each drawing. Further, a similar configuration in each drawing is assigned with the same number, and thereby repeated description thereof may be omitted. Furthermore, in the drawings to be used for the following description, description of a configuration of a portion that does not relate to description of the present invention may be omitted, and such a configuration may not be illustrated.

First Example Embodiment

A first example embodiment is described below with reference to the drawings.

[Description of Configuration]

First, a configuration of an information processing device 200 according to the first example embodiment is described with reference to the drawing.

FIG. 1 is a block diagram illustrating one example of the configuration of the information processing device 200 according to the first example embodiment of the present invention.

The information processing device 200 includes a target-image processing unit 201, a standard-image processing unit 202, a difference calculation unit 203, a smoothness calculation unit 204, a silhouette generation unit 205, a shape generation unit 206, a target-image capturing unit 207, a standard-image capturing unit 208, and a result output unit 209.

The target-image capturing unit 207 captures an image (hereinafter, referred to as a "target image") including a target.

The "target image" includes a target and includes a plurality of images each having a different imaging condition. In the following description, as one example, the target image includes two images (images having two imaging conditions). However, the number of the images included in the target image is not limited to two. The target image may include more than two images.

Further, the imaging condition of the information processing device 200 is not limited.

For example, the imaging condition may be a condition related to an electromagnetic wave to be used such as a wavelength band (or frequency band). The wavelength band is, for example, visible light and/or invisible light.

The wavelength band related to the target image is not limited. For example, the target image may be a plurality of visible-light images or a plurality of invisible-light images. Alternatively, the target image may be a visible-light image and an invisible-light image. The invisible-light image is, for example, an infrared image (far-infrared image or near-infrared image), an ultraviolet image, a terahertz wave image, or a radio wave image.

Alternatively, the imaging condition may be a condition related to an operation of capturing image such as an exposure, exposure time, or imaging time. Alternatively, the imaging condition may be a condition related to light during imaging such as lighting and/or presence or absence of a flash. The imaging condition may be a combination of the above.

The imaging condition may be previously determined, based on a target, an imaging range, an imaging environment (e.g., lighting and power supply), and/or an available imaging device and the like.

The standard-image capturing unit 208 captures a plurality of standard images associated with a target image.

The "standard image" is an image that does not include the target in the same imaging range as the target image. Each of standard images is associated with each of target images. The imaging condition of the standard image is the same as the associated target image.

However, "the same" in the imaging condition for the target image and the standard image is not limited to exact matching. The imaging condition for the target image and the standard image may be different as long as a structure image described later can be generated.

For example, when the imaging condition is an imaging time, the imaging time of the standard image may be different from the imaging time of the target image as long as an object being a background is substantially the same. For example, when the target is a moving body such as an automobile, the standard image may be an image before the target enters the imaging range or after the target moves out of the imaging range.

Alternatively, when the imaging condition is an exposure or exposure time, the standard image and the target image each may be captured by using an appropriate exposure or appropriate exposure time at a time to be captured. This is because the appropriate exposure or the appropriate exposure time may differ, based on presence or absence of the target.

The target-image processing unit 201 generates, based on the target image and the standard image in each of a plurality of the imaging conditions, a target structure image associated with the target image in each of the imaging conditions.

The "target structure image" is an image constituted of an element (hereinafter, referred to as an "image structure" or simply a "structure") indicating a shape feature of an object included in the target image.

The image structure of the information processing device 200 is not limited. For example, the image structure may be an object outline and/or a flat region to be generally used. However, the image structure is not limited to these. For example, when the target and the like have a feature in texture or a shape, the image structure may be determined, based on a texture region or a shape of an element.

A plurality of methods are proposed as a method for generating the image structure, based on the image (target image) that includes a target and the image (standard image) that does not include the target. As such a method, for example, a guided filter (e.g., see NPL 4), a joint bilateral filter (e.g., see NPL 5), a mutual-structure joint filter (e.g., see NPL 6), and the like are proposed. The target-image processing unit 201 may generate the target structure image by using these methods.

In the following description, each pixel value of the target structure image is represented as "$I_p$". Herein, "p" is an index representing a position (number) of a pixel in an image.

Note that the image is two-dimensional data, and thus the position of a pixel may be indicated by using positions in two directions (e.g., vertical and horizontal). However, in the description of the present example embodiment, the pixel position (number) is treated as one-dimensional.

Note that the pixel value is not a single value but may include a plurality of values (e.g., pixels of a multispectral image or a hyperspectral image).

The standard-image processing unit 202 generates, based on the target image and the standard image, a standard structure image constituted of an image structure of an object included in the standard image, in each of a plurality of imaging conditions. The standard-image processing unit 202 may use a method (e.g., any of the methods described above) similar to the target-image processing unit 201.

In the following description, each pixel value of the target structure image is represented as "$V_p$". "p" is an index representing a position of a pixel similarly to the above.

The difference calculation unit 203 calculates a difference (hereinafter, referred to as an "individual difference") between the target structure image and the standard structure image in each of the imaging conditions.

The "individual difference" is a difference between a pixel value (first pixel value) of the target structure image and a pixel value (second pixel value) of the standard structure image in each of the imaging conditions. The difference is a value to be calculated for each pixel.

Then, the difference calculation unit 203 calculates a difference (hereinafter, referred to as a "composite difference") acquired by adding the individual differences by using a predetermined ratio.

However, according to the present example embodiment, the difference is not limited to the above. For example, a user may previously set the difference according to a property of the target image including the target.

One example of the composite difference is described. In the following description, the imaging conditions are visible light and far infrared. Accordingly, the target image and the standard image are each a set (pair) of visible-light image and far-infrared image. However, this does not limit the present example embodiment. For example, the target image and the standard image may be each a pair of visible-light image and near-infrared image. Alternatively, the target image and the standard image may be each a pair of visible-light image and terahertz wave image.

Next, variables to be used in the following description are described.

"$I_p^{VIS}$" is a pixel value of a visible-light target structure image. "$I_p^{FIR}$" is a pixel value of a far-infrared target structure image. "$V_p^{VIS}$" is a pixel value of a visible-light standard structure image. "$V_p^{FIR}$" is a pixel value of a far-infrared standard structure image. "$D_p$" is a composite difference for each pixel. "$D_p^{VIS}$" is an individual difference in each pixel of visible light. "$D_p^{FIR}$" is an individual difference in each pixel of far infrared light. "α" is a parameter previously set in the smoothness calculation unit 204. "|·|" is an absolute value (L1 norm). In this case, the difference calculation unit 203 calculates the composite difference $D_p$ by using Equation 1 described in the following.

$$D_p = \alpha D_p^{VIS} + D_p^{FIR} = \alpha |I_p^{VIS} - V_p^{VIS}| + |I_p^{FIR} - V_p^{FIR}| \quad \text{[Equation 1]}$$

In general, a visible-light image has higher resolution and lower noise, compared to a far-infrared image.

However, a visible-light image of a target may include a shadow, blown out highlights, and/or a blocked up shadow. Alternatively, a target such as glass is transparent to visible light and assimilates into a background object. In a region to be affected by the above, it is difficult to generate a highly precise silhouette image by using the visible-light image.

On the other hand, in the region as described above, a far-infrared image of a target often has no shadow, no blown out highlights, and/or no blocked up shadow. Further, a target such as glass does not transmit far infrared, compared to visible light, and thus in the far-infrared image, the target is difficult to be assimilated into a background.

However, in general, a far-infrared image often has low resolution and high noise.

Then, as described in Equation 1, the difference calculation unit 203 calculates the composite difference acquired by adding the individual difference in the visible-light image and the individual difference in the far-infrared image by using a predetermined ratio. As a result, the difference calculation unit 203 can calculate the composite difference having robustness against a shadow, blown out highlights, a blocked up shadow, and a transparent object, and also having high resolution and low noise.

Further detail is described as follows. The difference calculation unit 203 uses the individual difference "$D_p^{VIS}$" for the visible-light image being the first term of Equation 1, and thus can calculate the composite difference having high resolution and precision with regard to an outline region and the like of the target being an advantage of using a visible-light image. On the other hand, the difference calculation unit 203 uses the individual difference "$D_p^{FIR}$" for the far-infrared image being the second term of Equation 1, and thus can calculate more accurate composite difference in the region where it is difficult to calculate the precise difference in the visible-light image. The region where it is difficult to calculate a precise difference in the visible-light image is, for example, a region with a shadow, blown out highlights, a blocked up shadow, and a transparent region in the visible-light image.

In general, a visible-light image has higher resolution than a far-infrared image. Then, the difference calculation unit 203 often uses an actual number greater than 1 as a value of a, in order to increase influence of the individual difference of the visible-light image more than influence of the individual difference of the far-infrared image. However, the value of a is not limited to the actual number greater than 1. The value of a may be a positive actual number of 1 or less. Note that the difference calculation unit 203 may use a negative value as the value of a according to the imaging condition.

The composite difference described in Equation 1 adds the value acquired by multiplying the individual difference of the visible light by a parameter, and the individual difference of far infrared. In Equation 1, the difference calculation unit 203 uses the individual difference of the far infrared as it is. However, the composite difference is not limited to this. The difference calculation unit 203 may use, as the composite difference, the sum of the value acquired by multiplying the individual difference of the far infrared by the parameter, and the individual difference of the visible light. Alternatively, the difference calculation unit 203 may apply a predetermined parameter to each of the two individual differences.

In the above example, the difference calculation unit 203 adds the individual difference in visible light and the individual difference in far infrared by using a predetermined ratio (in this case, "α:1").

Similarly, when the number of the imaging conditions is greater than two, the difference calculation unit 203 may calculate, as the composite difference, a value acquired by adding the individual differences in each of the imaging conditions by using the predetermined ratio (or parameter).

The smoothness calculation unit 204 calculates a smoothness (hereinafter, referred to as an "individual smoothness") of the target structure image in each of the imaging conditions.

The "individual smoothness" is a difference between a value (pixel value) of a pixel (target pixel) being a target and a value (pixel value) of a pixel at a predetermined position with respect to the pixel being a target. The predetermined position may be an adjacent position (one before or one behind), or may be a position of a vicinity located away at a predetermined number of pixels. In general, the adjacent position is often used, and thus, in the following description, the above-described predetermined positions are collectively referred to as an "adjacent position". In the following description, "q" is an index for representing the adjacent position. The pixel at the adjacent position is an adjacent pixel. Note that "p" is a position of the target pixel.

Then, the smoothness calculation unit 204 calculates a smoothness (hereinafter, referred to as a "composite smoothness") acquired by adding a plurality of pieces of the individual smoothness.

However, according to the present example embodiment, the smoothness is not limited to the difference between the pixel values (difference between a value of the target pixel and a value of the adjacent pixel). The smoothness may be larger as the difference between the value of the target pixel and the value of the adjacent pixel is larger. For example, the smoothness may be a value calculated by applying the difference to a predetermined function.

One example of the composite smoothness is described.

"$L_{pq}$" is a composite smoothness with respect to an adjacent pixel(q) in a target pixel(p). "$L_{pq}^{VIS}$" is an individual smoothness in a visible-light image. "$L_{pq}^{FIR}$" is an individual smoothness in a far-infrared image. "$\beta^{VIS}$" and "$\beta^{FIR}$" are parameters previously set in the smoothness calculation unit 204 for each of visible light and far infrared. In this case, the smoothness calculation unit 204 calculates the composite smoothness $L_{pq}$ by using the following Equation 2. Note that the smoothness in a pixel having no adjacent pixel, such as an edge pixel, is set to a predetermined value (e.g., "0").

$$L_{pq}=L_{pq}^{VIS}+L_{pq}^{FIR}=\exp(-|I_p^{VIS}-I_q^{VIS}|/\beta^{VIS})+\exp(-|I_p^{FIR}-I_q^{FIR}|/\beta^{FIR})$$ [Equation 2]

$\exp(\cdot)$ is an exponential function having Napier's constant (a base of natural logarithm) as a base. However, the base of the exponential function is not limited to the Napier's constant. For example, the base may be a predetermined integer (e.g., "10") or a predetermined actual number.

Similarly, when the number of the imaging conditions is greater than two, the smoothness calculation unit 204 may calculate, as the composite smoothness, an individual smoothness by using a predetermined parameter for each of the imaging conditions, and calculate a value acquired by adding a plurality of pieces of the calculated individual smoothness.

The smoothness calculation unit 204 may add, when adding a plurality of pieces of the individual smoothness, by setting a predetermined ratio for each imaging condition.

The silhouette generation unit 205 generates a silhouette image associated with the target, based on the composite difference and the composite smoothness.

A method for generating a silhouette image by the information processing device 200 is not limited. For example, the silhouette generation unit 205 may determine a region of a target by using graph cut (e.g., see NPL 7), based on the composite difference and the composite smoothness, and determine a pixel value (third pixel value) of the silhouette image, based on the determination. For example, the silhouette generation unit 205 may generate a silhouette image in which a pixel value of the silhouette image in the region determined as the target is "black" and a pixel value in the region not determined as the target is "white".

Further specific example of generating a silhouette image is described.

In this example, the silhouette generation unit 205 calculates the pixel value of the silhouette image in such a way as to minimize, as a silhouette image, a loss function being the sum of predetermined functions having the pixel value in the silhouette image as an argument.

Equation 3 is one example of the loss function. "$X_p$" is a pixel value of the silhouette image at a pixel position (p). The silhouette generation unit 205 generates a pixel value ($X=\{X_p\}=(X_1, \ldots, X_N)$, N is the number of pixels) of the silhouette image that minimizes the loss function "$E(\{X_p\})$". Herein, a value of the pixel value "$X_p$" is a binary value (0 or 1). "0" is the pixel value of the region (background) that is not the target. "1" is the pixel value of the region of the target (foreground).

$$E(\{X_p\})=\Sigma_p g_p(X_p)+\Sigma_{pq} h_{pq}(X_p,X_q)$$ [Equation 3]

The first term on the right side is an error term associated with the difference. A function $g_p(X_p)$ of the error term is Equation 4. The second term is a smoothing term associated with the smoothness. A function $h_{pq}(X_p,X_q)$ of the smoothing term is Equation 5.

$$g_p(X_p)=X_p-\sigma(D-D_p;\xi)$$ [Equation 4]

$\sigma(\cdot;\xi)$ is a sigmoid function represented by a gain $\xi$. "D" is a parameter equivalent to a threshold value, and is a value previously set in the silhouette generation unit 205. The function $g_p(X_p)$ of the error term is a function for calculating a value associated with a difference between the pixel of the silhouette image and the composite difference.

$$h_{pq}(X_p,X_q)=L_{pq}|X_p-X_q|$$ [Equation 5]

The function $h_{pq}(X_p,X_q)$ of the smoothing term is a function for calculating a product of the smoothness ($|X_p-X_q|$) of the pixel of the silhouette image and the composite smoothness.

The silhouette generation unit 205 generates a silhouette image that minimizes the loss function described in Equation 3, by using the graph cut.

The loss function described above is a function including the pixel value of the silhouette image, the difference (composite difference), and the smoothness (composite smoothness).

Note that the loss function is not limited to the above. For example, the loss function may be a function using the pixel value of the silhouette image, the individual difference, and the individual smoothness. In this case, the silhouette generation unit 205 may acquire the individual difference from the difference calculation unit 203 and the individual smoothness from the smoothness calculation unit 204.

Note that the silhouette generation unit 205 may change the pixel value of the silhouette image being the binary value as acquired above, to a value convenient for use in the shape generation unit 206 described below, an unillustrated external device, or the like.

The shape generation unit 206 generates a shape of the target, based on the silhouette image. A method for generating a shape by the shape generation unit 206 is not limited. For example, the shape generation unit 206 may generate a shape by using the method described in NPL 1. Alternatively, the shape generation unit 206 may determine a region of the target by using the silhouette image, and generate a shape, based on the determined region and the target image.

The shape generation unit 206 may use a plurality of silhouette images for generating a shape. In this case, the shape generation unit 206 may generate the shape after a predetermined number of silhouette images are generated. Alternatively, the shape generation unit 206 may generate the shape each time when a silhouette image is generated. At that time, the shape generation unit 206 may use all or a predetermined number of silhouette images generated before, as needed. In order to use the previous silhouette image, the information processing device 200 may include an unillustrated storage unit that stores the silhouette image.

The result output unit 209 transmits, to a predetermined device, the silhouette image and/or the shape. The result output unit 209 may include an unillustrated display unit and display the silhouette image and/or the shape.

[Description of Operation]

Next, an operation of the information processing device 200 according to the first example embodiment is described with reference to the drawing.

Figure 2:
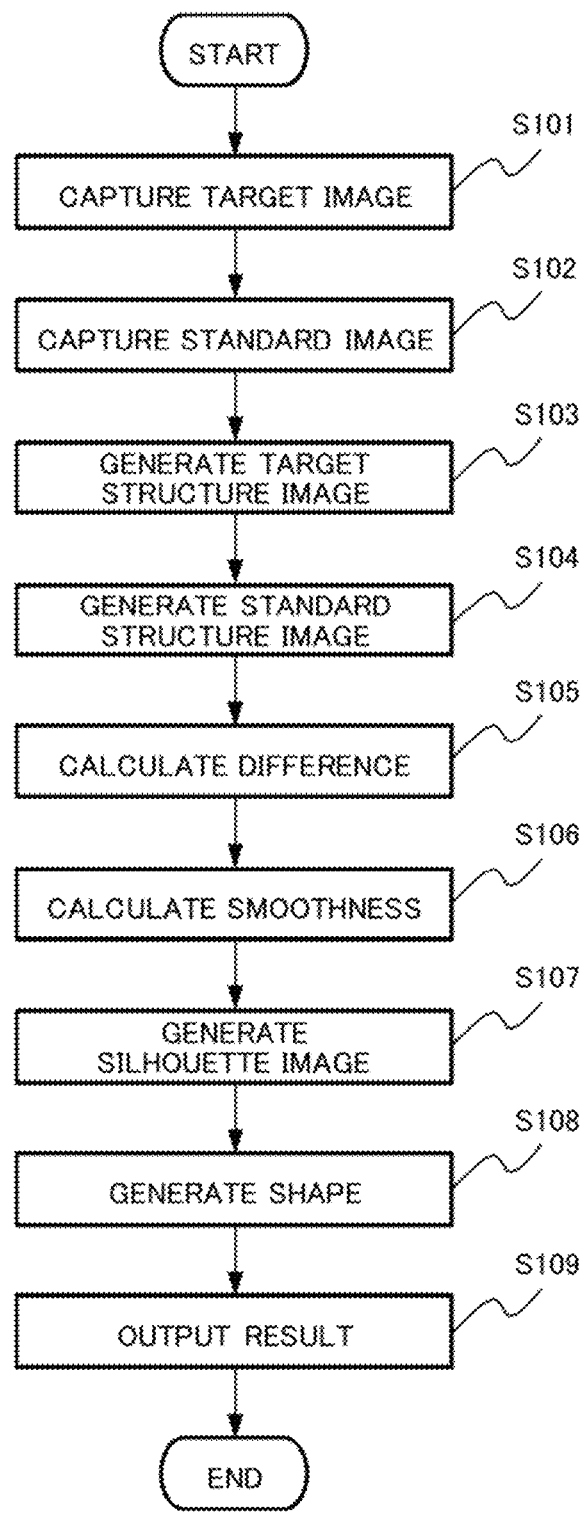
FIG. 2 is a flowchart illustrating one example of an operation of the information processing device according to the first example embodiment.

FIG. 2 is a flowchart illustrating one example of the operation of the information processing device 200 according to the first example embodiment.

The target-image capturing unit 207 captures target images in a plurality of imaging conditions (step S101).

The standard-image capturing unit 208 captures a plurality of standard images associated with the target images (step S102).

The order of the operations of the target-image capturing unit 207 and the standard-image capturing unit 208 is not limited to the above. The target-image capturing unit 207 may capture the target images after the standard-image capturing unit 208 captures the standard images. Alternatively, the target-image capturing unit 207 and the standard-image capturing unit 208 may operate in parallel.

The target-image processing unit 201 generates a target structure image, based on the target image and the standard image in each of the imaging conditions (step S103).

The standard-image processing unit 202 generates a standard structure image, based on the target image and the standard image in each of the imaging conditions (step S104).

The order of the operations of the target-image processing unit 201 and the standard-image processing unit 202 is not limited to the above. The target-image processing unit 201 may operate after the standard-image processing unit 202 operates. Alternatively, the target-image processing unit 201 and the standard-image processing unit 202 may operate in parallel.

The difference calculation unit 203 calculates a difference, based on the target structure image and the standard structure image (step S105). More specifically, the difference calculation unit 203 calculates an individual difference being a difference between the target structure image and the standard structure image in each of the imaging conditions, and calculates a composite difference, based on the individual differences.

The smoothness calculation unit 204 calculates a smoothness, based on the target structure image (step S106). More specifically, the smoothness calculation unit 204 calculates an individual smoothness being a smoothness of the target structure image in each of the imaging conditions, and calculates a composite smoothness, based on the individual smoothness.

The order of the operations of the difference calculation unit 203 and the smoothness calculation unit 204 is not limited to the above. The difference calculation unit 203 may operate after the smoothness calculation unit 204 operates. Alternatively, the difference calculation unit 203 and the smoothness calculation unit 204 may operates in parallel.

The silhouette generation unit 205 generates a silhouette image, based on the composite difference and the composite smoothness (step S107).

The shape generation unit 206 generates a shape of the target, based on the silhouette image (step S108).

Then, the result output unit 209 outputs, to a predetermined device, the result (the silhouette image and/or the shape) (step S109).

In this way, even when a shadow and the like of the target exist in one image (e.g., a visible-light image), the information processing device 200 uses another image (e.g., a far-infrared image), and thus the silhouette image can be generated more robustly, compared to a case where one image is used. As a result, the information processing device 200 can robustly restore the shape.

For example, a case where the target image is a visible-light image and a far-infrared image is described.

A visible-light image has high resolution and low noise. However, it is assumed that there is a region with a shadow, blown out highlights, and/or a blocked up shadow in a region of the visible-light image. However, the region has high possibility of existing no shadow, no blown out highlights, and/or no blocked up shadow in the far-infrared image.

Therefore, first, the target-image processing unit 201 and the standard-image processing unit 202 generate structure images (the target structure image and the standard structure image) in each of the visible-light image and the far-infrared image.

Then, the difference calculation unit 203 calculates the individual differences in each of visible light and far infrared, based on the structure images (the target structure image and the standard structure image) of the visible light and of the far infrared. Then, the difference calculation unit 203 calculates the composite difference, based on the individual differences of the visible light and of the far infrared.

The difference calculation unit 203 uses the structure images of the visible light and of the far infrared, and thereby removing influence of a shadow, blown out highlights, and/or a blocked up shadows in the visible-light image, and also calculating the composite difference of which image structure such as an outline of the target has high precision and low noise.

Further, the smoothness calculation unit 204 calculates the individual smoothness in each of the visible-light image and the far-infrared image, based on the target structure images of the visible light and of the far infrared. Then, the smoothness calculation unit 204 calculates the composite smoothness, based on the individual smoothness of the visible light and the individual smoothness of the far infrared.

The smoothness calculation unit 204 uses the target structure images of the visible light and of the far infrared, and thereby removing influence of a shadow, blown out highlights, and/or a blocked up shadows in the visible-light image, and also calculating the composite smoothness of which image structure such as an outline of the target has high precision and low noise.

Then, the silhouette generation unit 205 generates a silhouette image, based on the above-described composite difference and composite smoothness.

In this way, the information processing device 200 uses a plurality of target images and standard images, and thereby, even when there is a part with a shadow, blown out highlights, and/or blocked up shadow in any of the target images, the information processing device 200 can remove influence thereof and generates an accurate silhouette image.

Further, for example, a target such as glass is a transparent region in visible light. However, the region is not transparent in a far-infrared image. The information processing device 200 uses the visible-light image and the far-infrared image, and thereby, even when there is a transparent region in visible light, the information processing device 200 can remove influence thereof and generate an accurate silhouette image.

Further, when the information processing device 200 includes a high-quality image in the target images, the information processing device 200 can generate a silhouette image with high precision, based on the high-quality image.

For example, a case of a visible-light image and a far-infrared image is described. In general, a visible-light image is high-quality (high resolution and/or low noise), compared to a far-infrared image.

The information processing device 200 can generate, when the target image includes a visible-light image and a far-infrared image, a silhouette image with high precision, based on the characteristic of high resolution and/or low noise in the visible-light image. Then, the information processing device 200 uses the silhouette image with high precision, and thus the information processing device 200 can generate a shape with higher precision.

With reference to the drawing, the operation of the information processing device 200 is further described.

Figure 3:
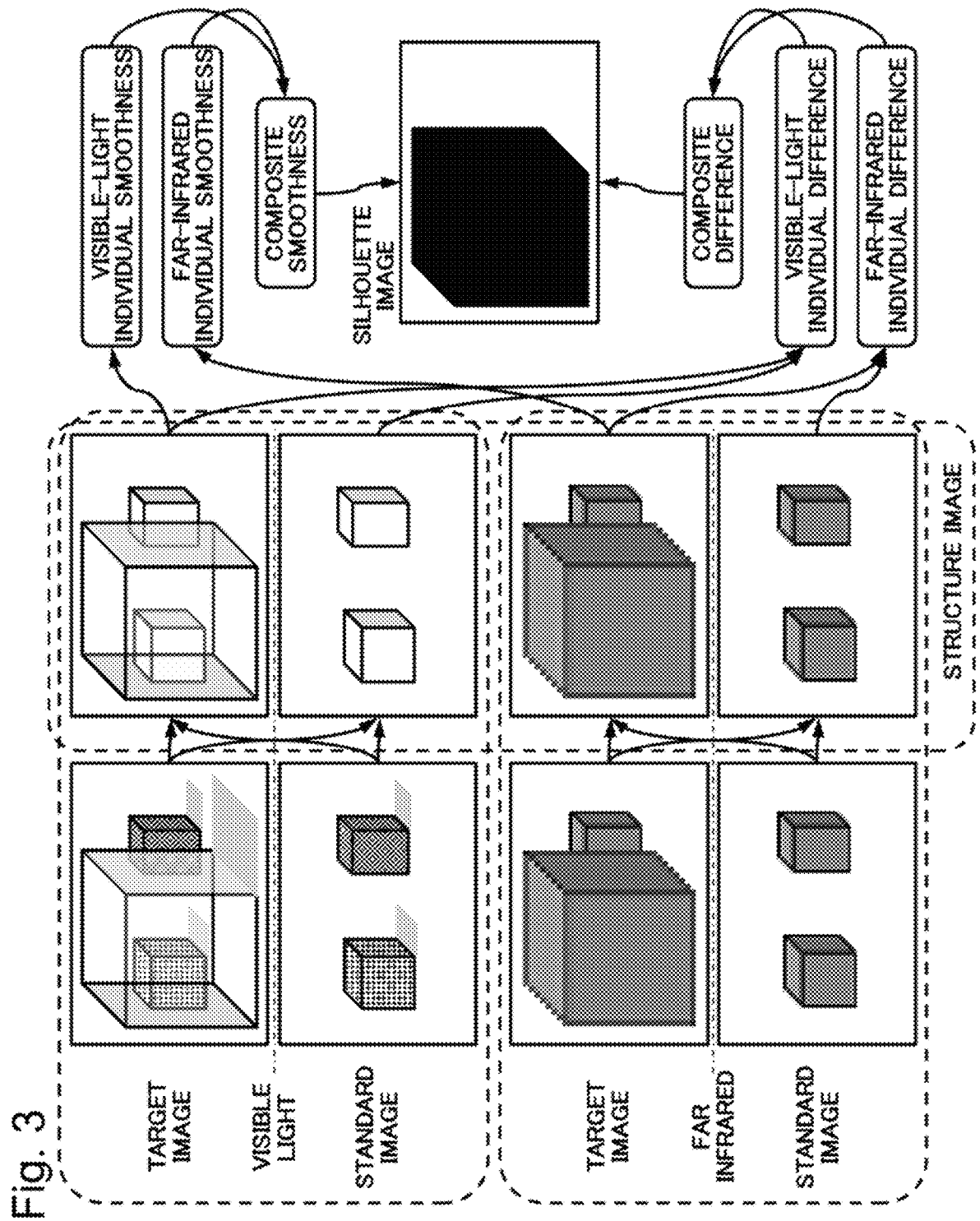
FIG. 3 is a diagram illustrating the operation according to the first example embodiment.

FIG. 3 is a diagram illustrating the operation according to the first example embodiment. FIG. 3 is an example of using a visible-light image and a far-infrared image.

The four images on the left side in FIG. 3 are target images and standard images.

The largest cuboid in the top image and the third image is a target. The target is an object having transparency to visible light.

The other two cuboids are background objects. The background objects are an object having a pattern on the surface in visible light.

The top image is a visible-light target image. The second image is a visible-light standard image. The third image is a far-infrared target image. The bottom image is a far-infrared standard image.

The visible-light images have higher resolution, compared to the far-infrared images. However, the target is transparent to visible light, and thus the objects behind (background) are visible in the visible-light target image.

On the other hand, in the far-infrared target image, the outline of the objects (background) behind the target does not occur. However, the far-infrared images have low resolution.

The target-image processing unit 201 generates a visible-light target structure image and a far-infrared target structure image, from the visible-light target image and standard image, and the far-infrared target image and standard image.

The standard-image processing unit 202 generates a visible-light standard structure image and a far-infrared standard structure image, from the visible-light target image and standard image, and the far-infrared target image and standard image.

The four images in the center of FIG. 3 are one example of the structure image.

The top image is the visible-light target structure image. The second image is the visible-light standard structure image. The third image is the far-infrared target structure image. The bottom image is the far-infrared standard structure image.

In the visible-light target structure image, the surface pattern and the like are deleted, resulting in the image of the structure. However, in the visible-light target structure image, the structure of the objects behind the target remains. Further, in the visible-light target structure image, a part of the structure (outline) of the target is lost due to influence of a shadow.

The difference calculation unit 203 calculates the individual difference of visible light and the individual difference of far infrared, by using the visible-light target structure image and standard structure image, and the far-infrared target structure image and standard structure image. Then, the difference calculation unit 203 calculates the composite difference, based on the individual differences.

The smoothness calculation unit 204 calculates the individual smoothness of visible light, based on the visible-light target structure image, and calculates the individual smoothness of far infrared, based on the far-infrared target structure image. Then, the smoothness calculation unit 204 calculates the composite smoothness, based on the individual smoothness.

The silhouette generation unit 205 generates a silhouette image, based on the composite difference and the composite smoothness.

The difference calculation unit 203 and the smoothness calculation unit 204 generates the appropriate composite difference and composite smoothness, respectively, based on the visible-light structure images for resolution and the like, and the far-infrared structure images for the influence of the objects (background) behind and the influence of blown out highlights, blocked up shadow, and a shadow.

As a result, the silhouette generation unit 205 can generate more appropriate silhouette image.

The image on the right side in FIG. 3 is one example of the silhouette image.

Description of an Advantageous Effect

An advantageous effect according to the first example embodiment is described.

In this way, the information processing device 200 according to the first example embodiment is able to acquire an advantageous effect of generating an appropriate silhouette image without requiring information being a guide.

The reason is as follows.

The information processing device 200 includes the target-image processing unit 201, the standard-image processing unit 202, the difference calculation unit 203, the smoothness calculation unit 204, and the silhouette generation unit 205. The target-image processing unit 201 generates, based on a target image that includes a target and a standard image that does not include the target, a target structure image being an image of an element indicating a shape feature of an object included in the target image, in each of a plurality of imaging conditions. The standard-image processing unit 202 generates, based on the target image and the standard image, a standard structure image being an image of an element indicating a shape feature of an object included in the standard image, in each of a plurality of the imaging conditions. The difference calculation unit 203 calculates an individual difference being a difference between the target structure image and the standard structure image in each of the imaging conditions, and calculates a composite difference, based on the individual differences. The smoothness calculation unit 204 calculates an individual smoothness being a smoothness of the target structure image in each of the imaging conditions, and calculates a composite smoothness, based on the individual smoothness. The silhouette generation unit 205 generates a silhouette image of the target, based on the composite difference and the composite smoothness.

The target-image processing unit 201 and the standard-image processing unit 202 generate structure images associated with each of a plurality of the imaging conditions, by using the target images and the standard images in each of a plurality of the imaging conditions. Therefore, even when the structure image in any imaging condition includes a degraded region, there is a possibility that the structure image in the other imaging condition becomes the structure image with high precision for the degraded region.

The difference calculation unit 203 and the smoothness calculation unit 204 calculate a plurality of individual differences and a plurality of pieces of individual smoothness, by using the structure images in the above-described plurality of imaging conditions. Then, the difference calculation unit 203 and the smoothness calculation unit 204 calculate a composite difference and a composite smoothness, based on a plurality of the individual differences and a plurality of pieces of the individual smoothness. Therefore, the difference calculation unit 203 and the smoothness calculation unit 204 can calculate a highly precise composite difference and composite smoothness.

The silhouette generation unit 205 uses the highly precise composite difference and composite smoothness, and therefore, even when a part of the target image includes a degraded region, the silhouette generation unit 205 generates an appropriate silhouette image.

A user and the like can perform processing (e.g., generation of a shape) using the generated silhouette image.

Further, the information processing device 200 includes the shape generation unit 206. The shape generation unit 206 generates a shape of the target, based on the silhouette image. As described above, according to the present example embodiment, the silhouette image has high precision. Therefore, the shape generation unit 206 generates a shape with improved precision.

A user can confirm the shape of the target, by using the generated shape with high precision.

Further, the information processing device 200 includes the target-image capturing unit 207, the standard-image capturing unit 208, and the result output unit 209.

With these configurations, the information processing device 200 can capture the target image and the standard image from an outside, and output a result (silhouette image and/or shape) to a predetermined device.

However, the information processing device 200 may include an unillustrated storage unit and capture the target image and/or the standard image from the storage unit, and may also store the silhouette image and/or the shape in the storage unit. In this case, the information processing device 200 does not need to include the target-image capturing unit 207, the standard-image capturing unit 208, the shape generation unit 206, and/or the result output unit 209.

OVERVIEW OF EXAMPLE EMBODIMENT

An overview of the first example embodiment is described with reference to the drawing.

Figure 4:
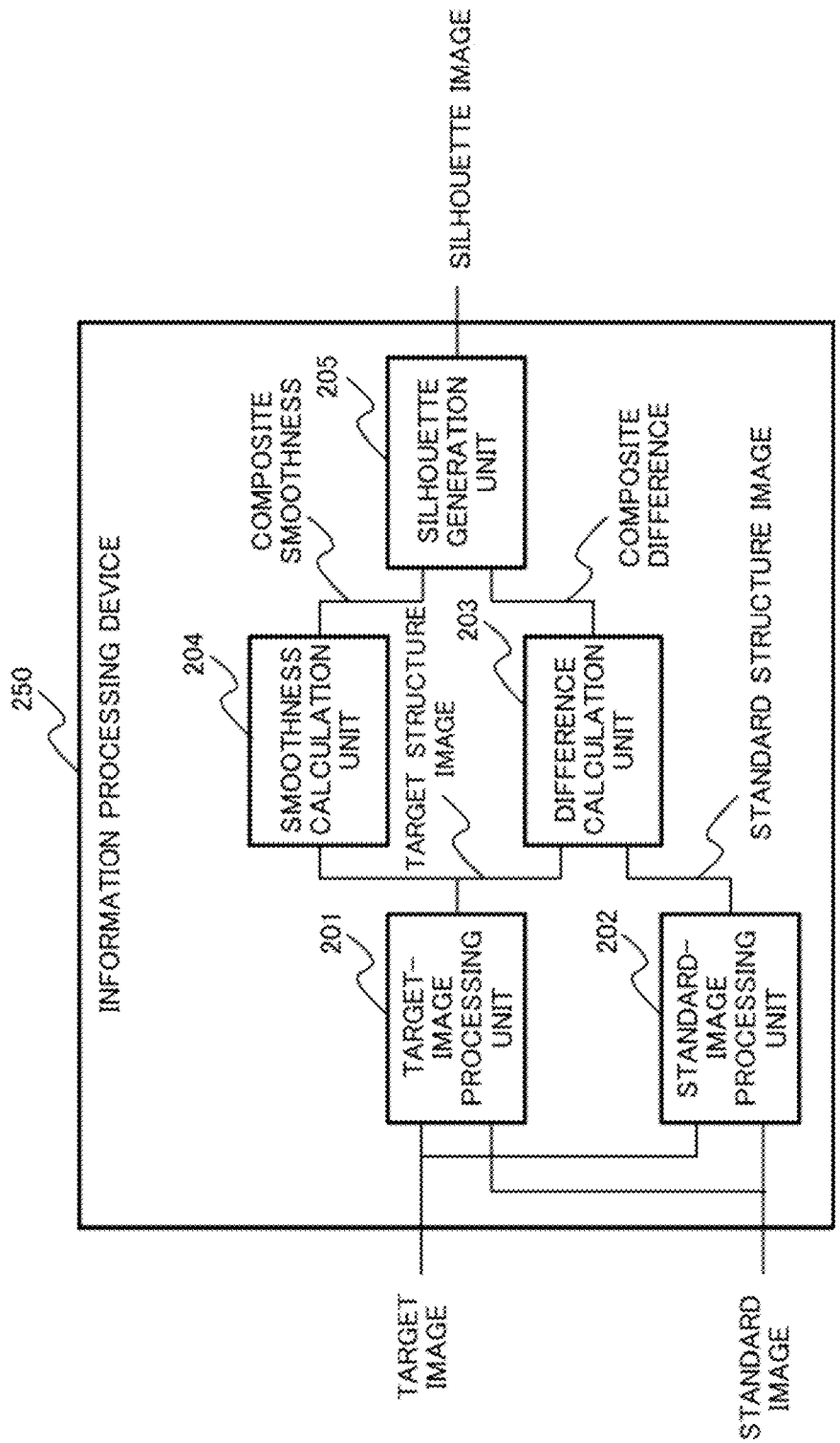
FIG. 4 is a block diagram illustrating one example of an overview of the information processing device according to the first example embodiment.

FIG. 4 is a block diagram illustrating one example of a configuration of an information processing device 250 being the overview of the first example embodiment.

The information processing device 250 includes the target-image processing unit 201, the standard-image processing unit 202, the difference calculation unit 203, the smoothness calculation unit 204, and the silhouette generation unit 205. The target-image processing unit 201 generates, based on a target image that includes a target and a standard image that does not include the target, a target structure image being an image of an element indicating a shape feature of an object included in a target image, in each of a plurality of imaging conditions. The standard-image processing unit 202 generates, based on the target image and the standard image, a standard structure image being an image of an element indicating a shape feature of an object included in a standard image, in each of a plurality of the imaging conditions. The difference calculation unit 203 calculates an individual difference being a difference between the target structure image and the standard structure image in each of the imaging conditions, and calculates a composite difference, based on the individual differences. The smoothness calculation unit 204 calculates an individual smoothness being a smoothness of the target structure image in each of the imaging conditions, and calculates a composite smoothness, based on the individual smoothness. The silhouette generation unit 205 generates a silhouette image of the target, based on the composite difference and the composite smoothness.

The target-image processing unit 201 and the standard-image processing unit 202 generate structure images associated with each of a plurality of the imaging conditions, by using the target images and the standard images in each of a plurality of the imaging conditions. Therefore, even when the structure image in any imaging condition includes a degraded region, there is a possibility that the structure image in the other imaging condition becomes the structure image with high precision for the degraded region.

The difference calculation unit 203 and the smoothness calculation unit 204 calculate a plurality of individual differences and a plurality of pieces of individual smoothness, by using the structure images in the above-described plurality of imaging conditions. Then, the difference calculation unit 203 and the smoothness calculation unit 204 calculate a composite difference and a composite smoothness, based on a plurality of the individual differences and a plurality of pieces of the individual smoothness. Therefore, the difference calculation unit 203 and the smoothness calculation unit 204 can calculate the highly precise composite difference and composite smoothness.

The silhouette generation unit 205 uses the highly precise composite difference and composite smoothness, and therefore, even when a part of the target image includes a degraded region, the silhouette generation unit 205 generates an appropriate silhouette image.

Similarly to the information processing device 200, the information processing device 250 configured in this way is able to produce an advantageous effect of generating an appropriate silhouette image without requiring information being a guide.

A reason for this is that the configuration in the information processing device 250 operates as described above and generates a silhouette image, similarly to the configuration in the information processing device 200.

Note that the information processing device 250 is a minimum configuration of the first example embodiment.

[Description of Hardware]

A hardware configuration of the information processing device 200 and the information processing device 250 is described with reference to the information processing device 200.

The information processing device 200 is configured as follows.

For example, each configuration unit of the information processing device 200 may be configured with a hardware circuit.

Alternatively, in the information processing device 200, each configuration unit may be configured by using a plurality of devices connected via a network.

Alternatively, in the information processing device 200, the plurality of configuration units may be configured with one piece of hardware.

Alternatively, the information processing device 200 may be achieved as a computer device including a central processing unit (CPU), a read only memory (ROM), and a random access memory (RAM). The information processing device 200 may be achieved as a computer device further including an input and output circuit (IOC) in addition to the above-described configuration. The information processing device 200 may be achieved as a computer device further including a network interface circuit (NIC) in addition to the above-described configuration.

Figure 5:
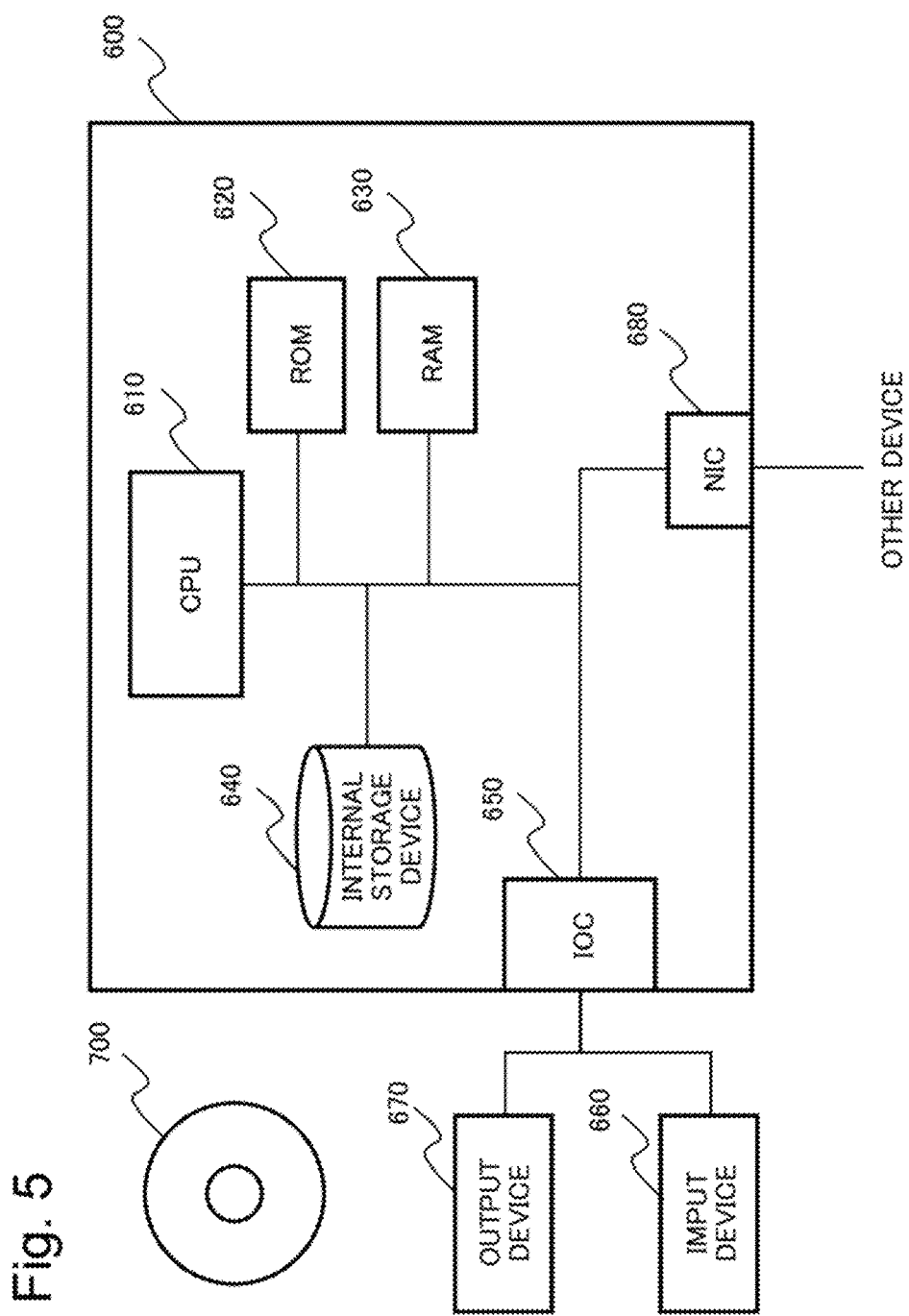
FIG. 5 is a block diagram illustrating one example of a hardware configuration of the information processing device according to the first example embodiment.

FIG. 5 is a block diagram illustrating a configuration of an information processing device 600 being one example of a hardware configuration of the information processing device 200 according to the first example embodiment.

The information processing device 600 includes a CPU 610, a ROM 620, a RAM 630, an internal storage device 640, an IOC 650, and a NIC 680, and configures a computer device.

The CPU 610 reads a program from the ROM 620. Then, the CPU 610 controls the RAM 630, the internal storage device 640, the IOC 650, and the NIC 680, based on the read program. Then, the computer including the CPU 610 controls these configurations, and each function as each configuration illustrated in FIG. 1 is achieved. Each configuration is each of the target-image capturing unit 207, the standard-image capturing unit 208, the target-image processing unit 201, the standard-image processing unit 202, the difference calculation unit 203, the smoothness calculation unit 204, the silhouette generation unit 205, the shape generation unit 206, and the result output unit 209.

Alternatively, the information processing device 200 may be configured by using a combination of hardware and software (program).

The program may be recorded in a recording medium 700 that stores a readable program by a computer, and be distributed. In this case, the CPU 610 may read the program included in the recording medium 700 to the RAM 630 or the internal storage device 640, by using an unillustrated recording medium reading device, and operate based on the read program.

The recording medium 700 is, for example, an optical disk, an exchangeable type magnetic disk, or an exchangeable type semiconductor memory.

Alternatively, the CPU 610 may receive a program from an unillustrated external device via the NIC 680, store the received program in the RAM 630 or the internal storage device 640, and operate based on the stored program.

The CPU 610 may use, when achieving each function, the RAM 630 or the internal storage device 640 as a temporary storage medium for the program.

The ROM 620 stores a program executed by the CPU 610 and fixed data. The ROM 620 is, for example, a programmable-ROM (P-ROM) or a flash ROM.

The RAM 630 temporarily stores a program executed by the CPU 610 and data. The RAM 630 is, for example, a dynamic-RAM (D-RAM).

The internal storage device 640 stores data and a program stored in the information processing device 600 for a long time. Further, the internal storage device 640 may operate as a temporary storage device of the CPU 610. The internal storage device 640 is, for example, a hard disk device, a magneto-optical disk device, a solid state drive (SSD), or a disk array device.

Herein, the ROM 620 and the internal storage device 640 are non-transitory recording media. In contrast, the RAM 630 is a transitory recording medium. Then, the CPU 610 can operate, based on a program stored in the ROM 620, the internal storage medium 640, or the RAM 630. In other words, the CPU 610 can operate by using a non-transitory recording medium or a transitory recording medium.

The IOC 650 mediates data between the CPU 610, and an input device 660 and an output device 670. The IOC 650 is, for example, an I/O interface card or a universal serial bus (USB) card. Further, the IOC 650 is not limited to a wired connection such as USB but may use a wireless connection.

The input device 660 is a device that receives an input instruction from an operator of the information processing device 600. The input device 660 is, for example, a keyboard, a mouse, or a touch panel. Alternatively, the input device 660 may be an imaging device. The information processing device 600 may include the input device 660. In this case, the input device 660 may operate as the target-image capturing unit 207 and/or the standard-image capturing unit 208.

The output device 670 is a device that outputs information to an operator of the information processing device 600. The output device 670 is, for example, a liquid crystal display or a printer. The information processing device 600 may include the output device 670. In this case, the output device 670 may operate as the result output unit 209.

The NIC 680 relays data transfer to an unillustrated external device via a network. The NIC 680 is, for example, a local area network (LAN) card. Further, the NIC 680 is not limited to a wired connection but may use a wireless connection. The NIC 680 may operate as the target-image capturing unit 207, the standard-image capturing unit 208, and/or the result output unit 209.

The information processing device 600 configured in this way can acquire an advantageous effect similar to the advantageous effect of the information processing device 200.

A reason for this is that the CPU 610 of the information processing device 600 can achieve, based on a program, a function similar to the function of the information processing device 200.

[Description of System]

An information processing system 300 including the information processing device 200 is described with reference to the drawing.

Figure 6:
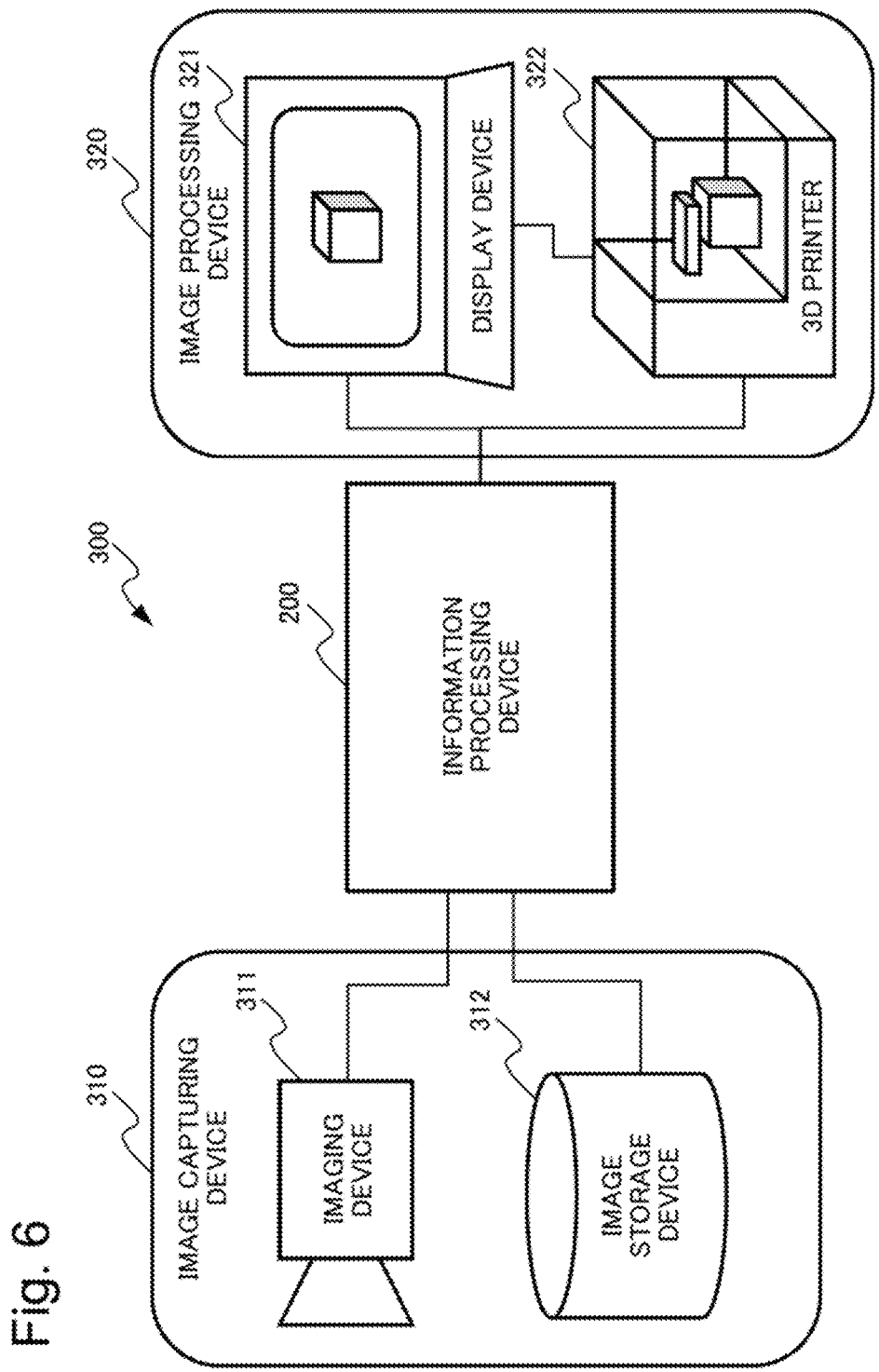
FIG. 6 is a diagram illustrating one example of a configuration of an information processing system according to the first example embodiment.

FIG. 6 is a block diagram illustrating one example of a configuration of the information processing system 300 according to the first example embodiment.

The information processing system 300 includes the information processing device 200, an image capturing device 310, and an image processing device 320.

The image capturing device 310 captures a target image and a standard image, and transmits the captured target image and standard image to the information processing device 200. A device for transmitting the target image and the standard image may be a single device or a plurality of devices.

FIG. 6 illustrates, as one example, a case where the image capturing device 310 includes an imaging device 311 and an image storage device 312.

The imaging device 311 captures the target image constantly or based on an instruction from a user or the like, and transmits the captured target image to the information processing device 200.

The image storage device 312 previously holds the standard image, and transmits the standard image in response to a request from the information processing device 200.

The information processing device 200 captures the target image and the standard image from the image capturing device 310. Then, the information processing device 200 generates a silhouette image of the target, based on the above-described operation. Then, the information processing device 200 transmits the generated silhouette image to the image processing device 320. The information processing device 200 may transmit, when including the shape generation unit 206, a shape to the image processing device 320.

The image processing device 320 performs processing using the received silhouette image (and the shape). The processing by the image processing device 320 is not limited. For example, the image processing device 320 may generate a shape, based on the received silhouette image, and display the generated shape.

Further, the image processing device 320 may output an object for indicating the generated shape. For example, the image processing device 320 may print the generated shape by using a printer. Alternatively, the image processing device 320 may generate a model of the target, based on the generated shape, by using a three-dimensional (3D) printer.

FIG. 6 illustrates, as one example, a case where the image processing device 320 includes a display device 321 and a 3D printer 322.

The display device 321 receives the silhouette image from the information processing device 200, generates the shape, and displays the generated shape. The display device 321 may receive the shape from the information processing device 200 and display the received shape.

The 3D printer 322 acquires the shape from the display device 321 or the information processing device 200, and generates a model, based on the shape.

A user of the information processing system 300 can easily confirm the target, based on the displayed shape or the generated model.

The specific configuration of the present invention is not limited to the above-described example embodiment, and modifications within the scope not departing from the gist of the present invention are included in the present invention.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-182578, filed on Sep. 22, 2017, the disclosure of which is incorporated herein in its entirety by reference.

REFERENCE SIGNS LIST

200 Information processing device
201 Target-image processing unit
202 Standard-image processing unit
203 Difference calculation unit
204 Smoothness calculation unit
205 Silhouette generation unit
206 Shape generation unit
207 Target-image capturing unit
208 Standard-image capturing unit
209 Result output unit
250 Information processing device
300 Information processing system
310 Image capturing device
311 Imaging device
312 Image storage device
320 Image processing device
321 Display device
322 3D printer
600 Information processing device
610 CPU
620 ROM
630 RAM
640 Internal storage device
650 IOC
660 Input device
670 Output device
680 NIC
700 Recording medium

The invention claimed is:

1. An information processing device comprising:
a memory; and
at least one processor coupled to the memory,
the processor performing operations, the operations comprising:
generating, based on a target image that includes a target and a standard image that does not include the target, a target structure image being an image of an element indicating a shape feature of an object included in the target image, in each of a plurality of imaging conditions;
generating, based on the target image and the standard image, a standard structure image being an image of an element indicating a shape feature of an object included in the standard image, in each of a plurality of the imaging conditions;
calculating an individual difference being a difference between the target structure image and the standard structure image in each of the imaging conditions, and calculating, based on the individual differences, a composite difference;
calculating an individual smoothness being a smoothness of the target structure image in each of the imaging conditions, and calculating, based on the individual smoothness, a composite smoothness; and
generating a silhouette image of the target, based on the composite difference and the composite smoothness.

2. The information processing device according to claim 1, wherein the operations further comprise:
generating a shape of the target, based on the silhouette image.

3. The information processing device according to claim 2, wherein the operations further comprise:
capturing a plurality of the target images;
capturing a plurality of the standard images; and
outputting the silhouette image and/or the shape.

4. The information processing device according to claim 1, wherein the operations further comprise
calculating, as the composite difference, a value acquired by adding the individual differences by using a predetermined ratio; and
calculating, as the composite smoothness, a value acquired by adding a plurality of pieces of the individual smoothness.

5. The information processing device according to claim 1, wherein the operations further comprise
calculating, as a pixel value of the silhouette image, a pixel value in such a way as to minimize a loss function that includes a difference between the pixel value of the silhouette image and the composite difference, and a product of a smoothness in the pixel value of the silhouette image, and the composite smoothness.

6. The information processing device according to claim 1, wherein
the imaging condition is a condition related to at least one of a wavelength band, an exposure, exposure time, and imaging time.

7. An information processing method comprising:
generating, based on a target image that includes a target and a standard image that does not include the target, a target structure image being an image of an element indicating a shape feature of an object included in the target image, in each of a plurality of imaging conditions;
generating, based on the target image and the standard image, a standard structure image being an image of an element indicating a shape feature of an object included in the standard image, in each of a plurality of the imaging conditions;
calculating an individual difference being a difference between the target structure image and the standard structure image in each of the imaging conditions, and calculating, based on the individual differences, a composite difference;
calculating an individual smoothness being a smoothness of the target structure image in each of the imaging conditions, and calculating, based on the individual smoothness, a composite smoothness; and
generating a silhouette image of the target, based on the composite difference and the composite smoothness.

8. A non-transitory computer-readable recording medium embodying a program, the program causing a computer to perform a method, the method comprising:
generating, based on a target image that includes a target and a standard image that does not include the target, a target structure image being an image of an element indicating a shape feature of an object included in the target image, in each of a plurality of imaging conditions;
generating, based on the target image and the standard image, a standard structure image being an image of an element indicating a shape feature of an object included in the standard image, in each of a plurality of the imaging conditions;
calculating an individual difference being a difference between the target structure image and the standard structure image in each of the imaging conditions, and calculating, based on the individual differences, a composite difference;
calculating an individual smoothness being a smoothness of the target structure image in each of the imaging conditions, and calculating, based on the individual smoothness, a composite smoothness; and
generating a silhouette image of the target, based on the composite difference and the composite smoothness.

* * * * *